US012193423B2

(12) United States Patent
Ahmed

(10) Patent No.: US 12,193,423 B2
(45) Date of Patent: Jan. 14, 2025

(54) GLIDE AND LEAP SYSTEM FOR FISHING LURE

(71) Applicant: Fahad Ahmed, Santa Clara, CA (US)

(72) Inventor: Fahad Ahmed, Santa Clara, CA (US)

( * ) Notice: Subject to any disclaimer, the term of this patent is extended or adjusted under 35 U.S.C. 154(b) by 74 days.

(21) Appl. No.: 17/937,359

(22) Filed: Sep. 30, 2022

(65) Prior Publication Data
US 2023/0397588 A1 Dec. 14, 2023

Related U.S. Application Data

(63) Continuation-in-part of application No. 29/842,413, filed on Jun. 13, 2022, now Pat. No. Des. 1,039,650.

(51) Int. Cl.
*A01K 85/00* (2006.01)

(52) U.S. Cl.
CPC ...... *A01K 85/1841* (2022.02); *A01K 85/1837* (2022.02)

(58) Field of Classification Search
CPC ............ A01K 85/1837; A01K 85/1841; A01K 85/1881; A01K 85/017; A01K 85/18; A01K 85/16; A01K 85/1863; A01K 85/1871
USPC ........... 43/42.15, 42.31, 42.39, 42.22, 42.02, 43/42.11, 42.48
See application file for complete search history.

(56) References Cited

U.S. PATENT DOCUMENTS

| | | | | | |
|---|---|---|---|---|---|
| 1,941,370 | A | * | 12/1933 | Vann | A01K 85/16 43/42.22 |
| 2,190,449 | A | * | 2/1940 | Goldammer | A01K 85/16 43/43.12 |
| 2,685,145 | A | * | 8/1954 | Dean | A01K 85/18 43/42.15 |
| 2,794,287 | A | * | 6/1957 | Mancuis, Jr. | A01K 85/16 D22/128 |
| 3,913,257 | A | * | 10/1975 | Colgan | A01K 85/16 43/42.09 |
| 4,380,132 | A | | 4/1983 | Atkinson | |
| 4,676,020 | A | * | 6/1987 | Taylor | A01K 85/01 43/42.35 |

(Continued)

OTHER PUBLICATIONS

Bassdash SwimShad Glide Baits Jointed Swimbait Bass Pike Salmon Trout Muskie Fishing Lure, retrieved from the internet, retrieved on Oct. 3, 2022; <URL: https://www.amazon.com/Bassdash-SwimShad-Jointed-Swimbait-Fishing/dp/B08JKFX4Z7?ref_=ast_sto_dp&th=1&psc=1>.

(Continued)

*Primary Examiner* — Darren W Ark
*Assistant Examiner* — William L Gmoser

(57) ABSTRACT

A glide and leap system for fishing lure includes a floating lure, a channel, a first weight, and a compression spring. The floating lure includes a head section and a tail section as the head section and the tail section are oppositely positioned of each other about a transverse plane of the floating lure. The channel is internally integrated into the head section and concentrically positioned along a sagittal plane of the floating lure. The channel is angularly oriented from a frontal plane of the floating lure to the transverse plane at an acute angle. The compression spring is positioned within the channel and positioned adjacent to the transverse plane. The first weight is adjacently positioned to the compression spring and the frontal plane as the first weight is slidably positioned within the channel.

7 Claims, 7 Drawing Sheets

(56) References Cited

U.S. PATENT DOCUMENTS

| | | | | |
|---|---|---|---|---|
| 5,299,378 | A * | 4/1994 | Ballard | A01K 85/00 |
| | | | | 43/42.15 |
| 5,787,633 | A * | 8/1998 | Taylor | A01K 85/16 |
| | | | | 43/42.36 |
| 5,829,183 | A * | 11/1998 | Guerin | A01K 85/18 |
| | | | | 43/42.31 |
| 6,006,465 | A * | 12/1999 | Brown | A01K 85/00 |
| | | | | 43/42.36 |
| 6,122,854 | A * | 9/2000 | Kinnear | A01K 85/16 |
| | | | | 43/42.22 |
| 6,718,684 | B2 | 4/2004 | Yong-Set | |
| 6,912,808 | B1 * | 7/2005 | Mak | A01K 85/16 |
| | | | | 43/42.35 |
| 6,966,141 | B1 * | 11/2005 | Taylor | A01K 85/01 |
| | | | | 43/42.36 |
| 7,712,245 | B1 | 5/2010 | Jarboe | |
| 7,788,841 | B1 * | 9/2010 | Donarummo | A01K 85/01 |
| | | | | 43/42.02 |
| 8,316,576 | B1 * | 11/2012 | Brown | A01K 85/01 |
| | | | | 43/42.31 |
| 8,966,810 | B2 * | 3/2015 | Scott | A01K 85/00 |
| | | | | 43/42.22 |
| 11,083,181 | B2 | 8/2021 | Priore | |
| 11,589,565 | B1 * | 2/2023 | Chan | A01K 85/01 |
| 2002/0144451 | A1 * | 10/2002 | Kruger | A01K 85/18 |
| | | | | 43/42 |
| 2002/0189150 | A1 * | 12/2002 | Thorne | A01K 85/18 |
| | | | | 43/42.15 |
| 2003/0093939 | A1 * | 5/2003 | Salonen | A01K 85/16 |
| | | | | 43/42.22 |
| 2003/0172578 | A1 * | 9/2003 | Harner | A01K 85/16 |
| | | | | 43/42.22 |
| 2007/0289196 | A1 * | 12/2007 | Scott | A01K 85/18 |
| | | | | 43/42.15 |
| 2015/0264902 | A1 * | 9/2015 | Scharle | A01K 85/01 |
| | | | | 43/42.31 |
| 2021/0352879 | A1 * | 11/2021 | Ahmed | A01K 85/1837 |

OTHER PUBLICATIONS

Steexun Lifelike 4 Segment Big Giant Sinking Fishing Bass Lures Artificial Hard Bart Swimbait for Fishing, Great for Fisherman Dad Gift, retrieved from the internet, retrieved on Oct. 3, 2022 <URL: https://www.amazon.com/Sfeexun-Lifelike-Artificial-Swimbait-Fisherman/dp/B07DNZ5861.

Megabass Products, retrieved from the internet, retrieved on Oct. 3, 2022; <URL: https://megabassusa.com/shop/>.

Shimano Hardbaits, retrieved from the internet, retrieved on Oct. 3, 2022; <URL: https://fish.shimano.com/en-US/product/list.html?pcat1=cg1SHIFNaLureBait&pcat2=cg2SHIFNaLureBaitHardbait&pcat3=&pcat4=&fs=&series=&price_min=&price_max=>.

Bassdash SwimShad Glide Baits Jointed Swimbait Bass Pike Salmon Trout Muskie Fishing Lure,3-Pack, retrieved from the internet, retrieved on Oct. 3, 2022; <URL: https://www.amazon.com/Bassdash-Swimbaits-Minnow-Fishing-SwimShad/dp/B09HWYFCPT/ref=sr_1_1?keywords=Bassdash%2BSwimShad%2BGlide%2BBaits%2BJointed%2BSwimbait%2BBass%2BPike%2BSalmon%2BTrout%2BMuskie%2BFishing%2BLure%2C3-Pack&qid=1664823905&qu=eyJxc2MiOilwLjAwliwicXNhIjoiMC4wMClslnFzcCl6ljAuMDAifQ%3D%3D&sr=8-1&th=1>.

* cited by examiner

GLIDE AND LEAP SYSTEM FOR FISHING LURE

The current application is a continuation-in-part (CIP) application of the U.S. design application Ser. No. 29/842,413 filed on Jun. 13, 2022.

FIELD OF THE INVENTION

The present invention generally relates to fishing accessories. More specifically, the present invention is a glide and leap system for fishing lure so that the fishing lure can glide through the water and leap out of the water upon utilization of the fishing pole.

BACKGROUND OF THE INVENTION

Baits and lures are essential for fishing and vary depending on the type of fish being caught and the kind of body of water. Though live baits are preferred as live bait better attract fish, fishing lures are easier to keep and reuse. Fishing lures, however, may increase fishing time and make catching a fish much more difficult as typical fishing lures may be more distinguishable by fish as fake. In addition, each fishing lure may be limited to what type of fish they attract depending on the exterior appearance. When the exciting fishing lures are controlled through a fishing pole, the exciting fishing lures either glide through a body of water or leap out of the body of water upon their structural configuration and fisherman's behavior. However, none of the exciting fishing lures are able to effectively glide through and leap out of the body of water.

It is an objective of the present invention to provide a glide and leap system for fishing lure so that the corresponding fishing lure can achieve glide through the body water and leap out of the water when necessary. More specifically, the present invention enables the fishing lures to achieve both the gliding and leaping abilities based upon the operation of the fishing lure. As a result, the present invention is able to maximize the type of fishes that attract towards the fishing lures.

DETAIL DESCRIPTIONS OF THE INVENTION

All illustrations of the drawings are for the purpose of describing selected versions of the present invention and are not intended to limit the scope of the present invention.

The present invention is a glide and leap system for fishing lure so that the user can glide the fishing lure through a body of water and leap out the fishing lure from the body of water. In other words, the present invention mimics the natural swimming movements of a real fish in the body of water and jumping movement of a real fish from the body of water. As the result, the present invention is able to attract verity of fishes during fishing activities. The present invention comprises a floating lure 1, a channel 4, a first weight 7, a compression spring 8 as shown in FIGS. 1-4.

In reference to the general configuration of the present invention, the channel 4 is integrated into the front-end of the fishing lure so that the first weight 7 and the compression spring 8 can operatively couple within the channel 4. Resultantly, the movement of the compression spring 8 and the weight allows the user to perform the gliding action and the leaping action during fishing activities. More specifically, when the fishing line is reeled and no jerking action is applied to the fishing rod, the present invention glides through the body of water as the first weight 7 does not slide within the channel 4. When the fishing line is reeled and jerking action is applied to the fishing rod, the present invention leaps out of the body of water due to the back and forth sliding movement of the first weight 7.

Figure 1:
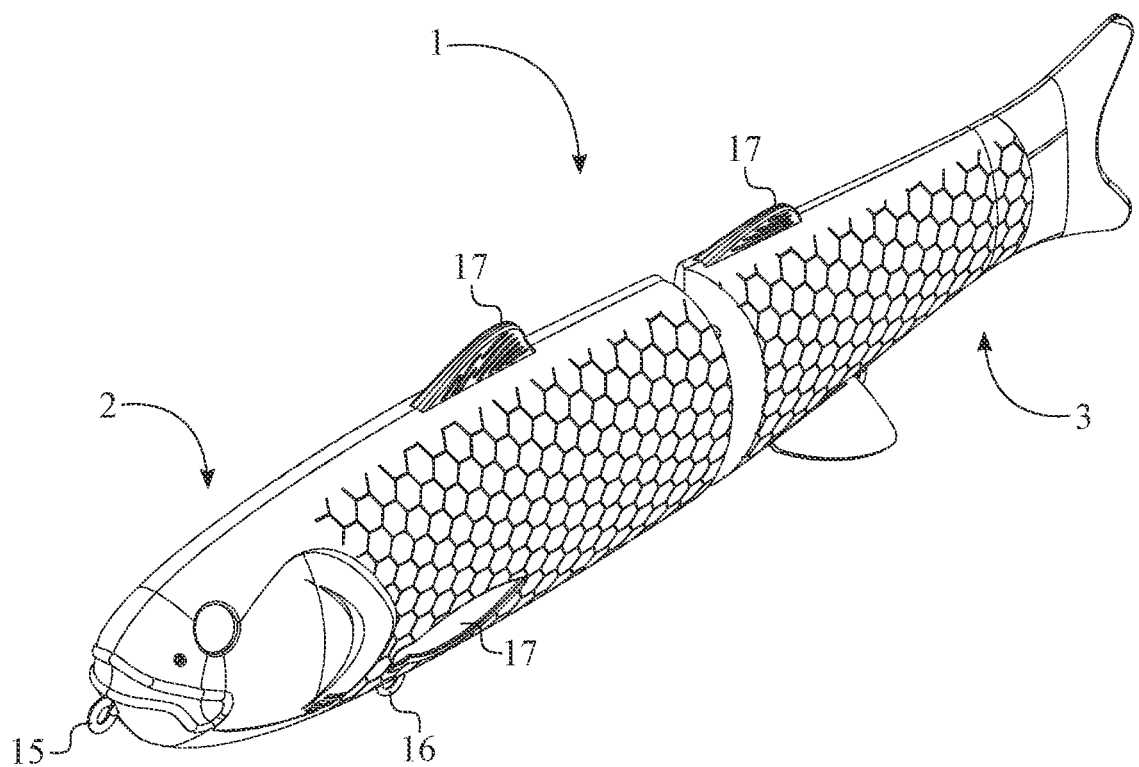
FIG. 1 is a perspective view of present invention.
Figure 2:
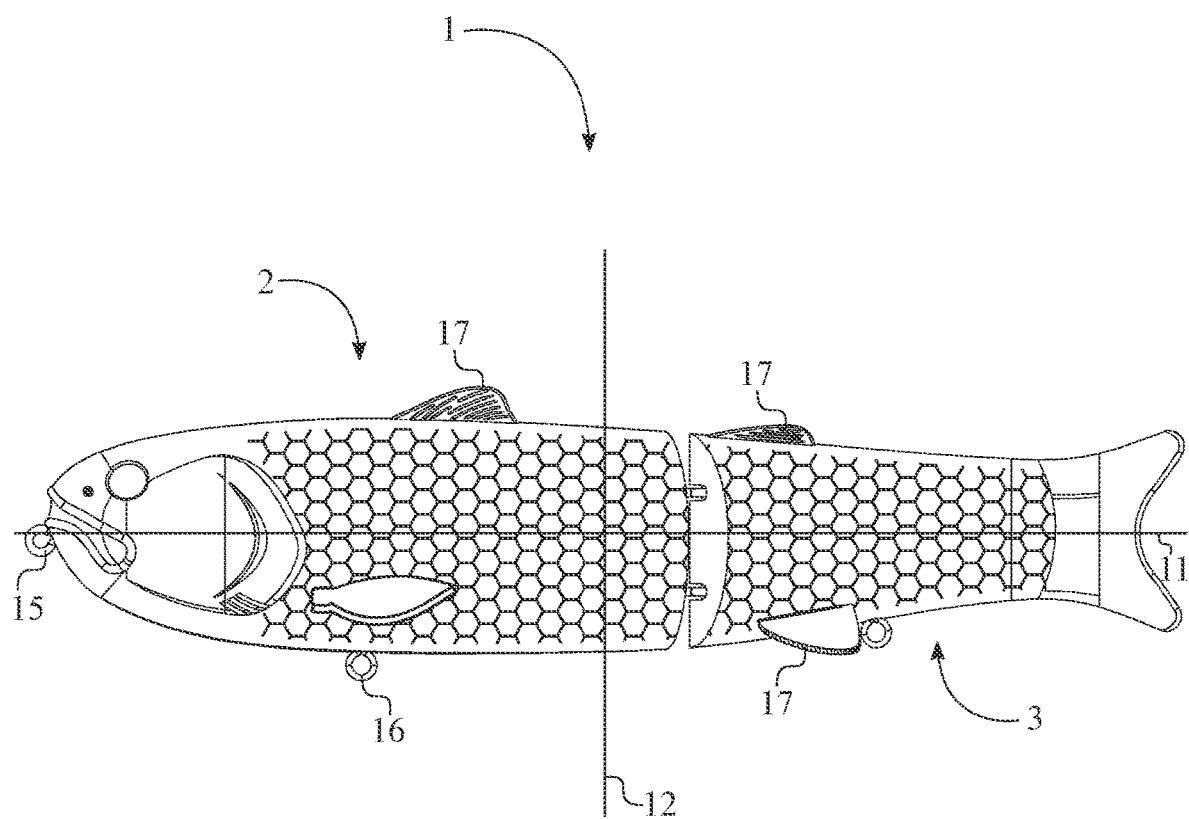
FIG. 2 is a side view of the present invention showing the frontal plane and the transverse plane.
Figure 3:
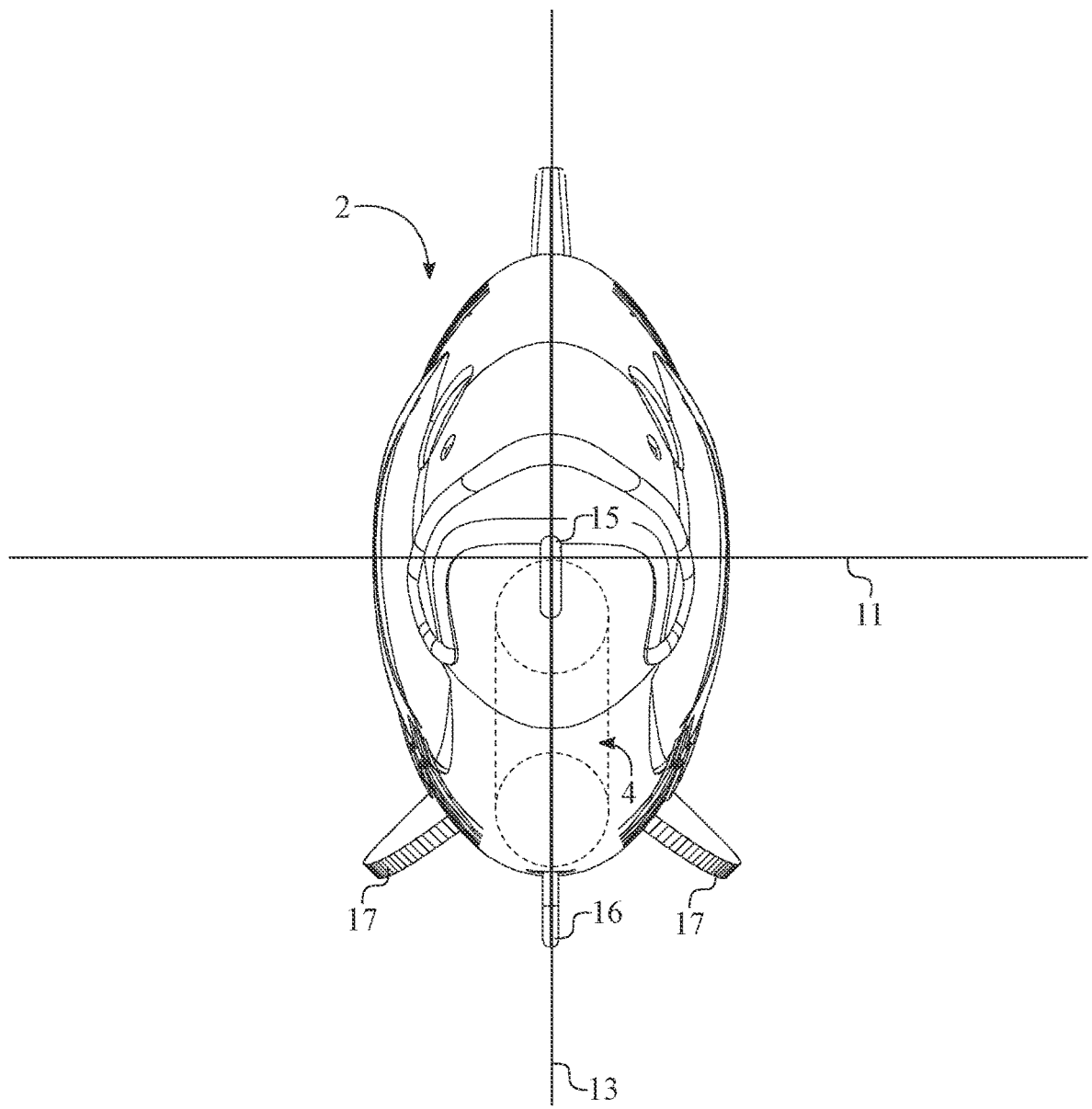
FIG. 3 is a side view of the present invention showing the sagittal plane, wherein the dash lines illustrate the internal positioning of the channel.

In reference to FIGS. 1-3, the floating lure 1 is formed into a fish-body thus mimicking a live bait. The floating lure 1 comprises a head section 2 and a tail section 3 as reference bodies so that the rest of the components of the present invention can be explained. More specifically, the head section 2 and the tail section 3 are oppositely positioned of each other about a transverse plane 12 of the floating lure 1. The contour and appearance of the floating lure 1 can be shaped into a variety of different fishes without deviating from the scope of the functionality. The floating lure 1 is preferably made of a soft-plastic material so that movement of the present invention can accurately mimic that of a live bait swimming in the body of water.

Figure 4:
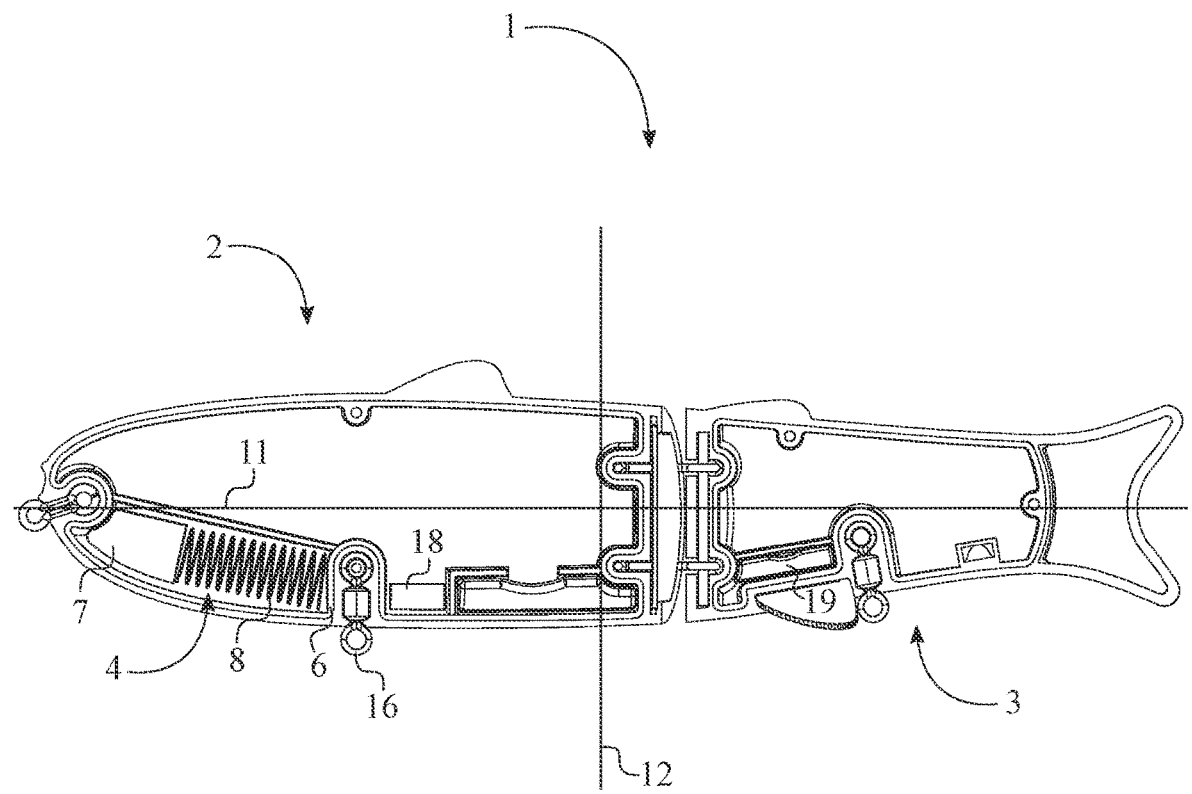
FIG. 4 is a cross-sectional view of the present invention, showing the internally mounted components.

In reference to FIG. 3 and FIG. 4, the channel 4 being internally integrated into the head section 2 thus allowing the compression spring 8 and the first weight 7 to be placed within. More specifically, the channel 4 is concentrically positioned along a sagittal plane 13 of the floating lure 1 so that the weight of first weight 7 does not tilt the floating lure 1 to the left side or the right side. The channel 4 is angularly oriented from a frontal plane 11 of the floating lure 1 to the transverse plane 12 at an acute angle 14. In other words, the channel 4 is angled upward from a belly of the floating lure 1 to a mouth of the floating lure 1. The angular positioning of the channel 4 results the first weight 7 to angularly slide within the floating lure 1 so that the present invention can perform the leaping action during fishing activities.

Figure 5:
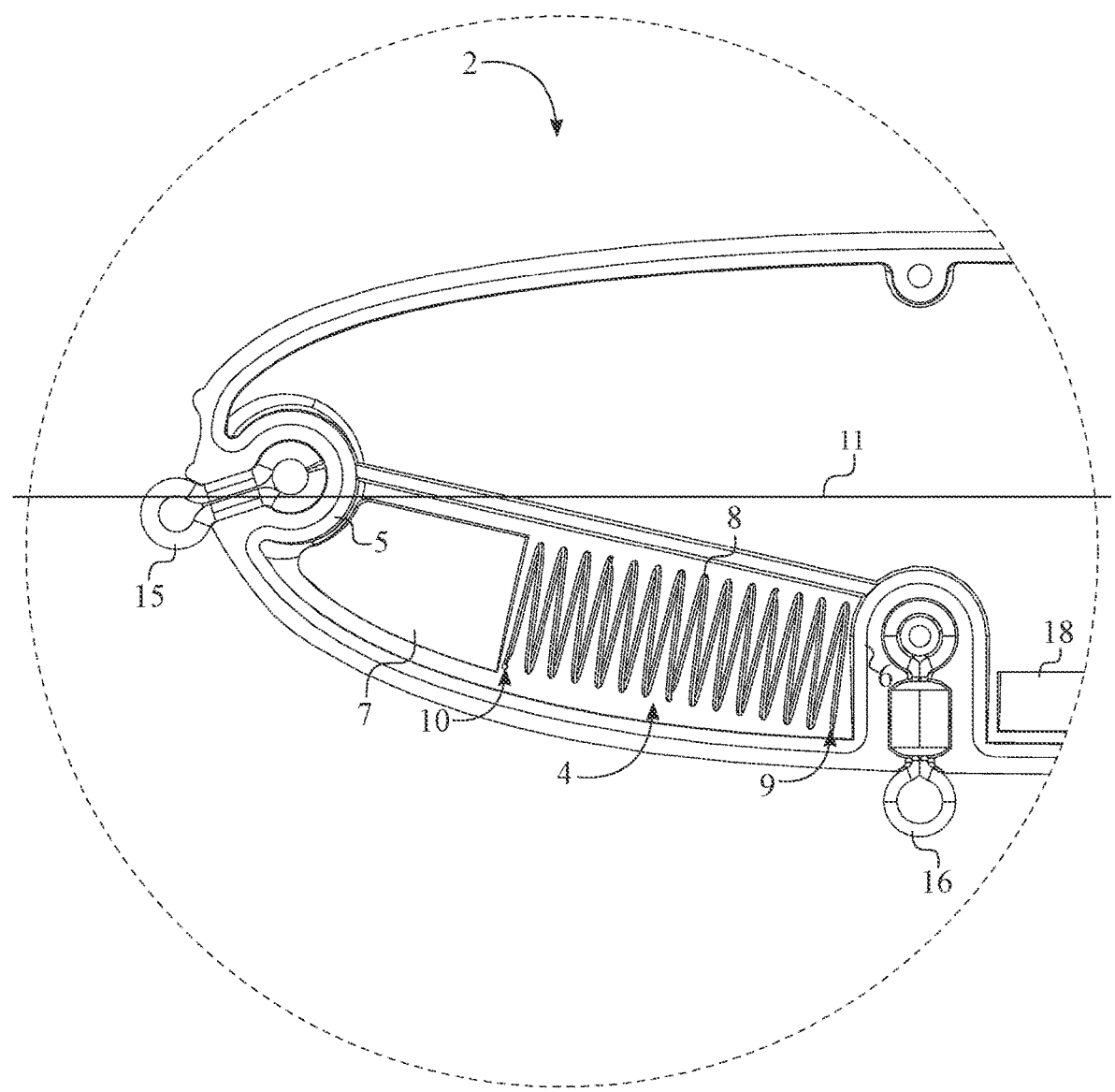
FIG. 5 is a cross-sectional view of the head section of the present invention, showing a detailed view of the internally mounted components and the first weight being position adjacent to the anterior end.

In reference to FIG. 4, the compression spring 8 is positioned within the channel 4 and adjacent to the transverse plane 12. The first weight 7 is adjacently positioned to the compression spring 8 and adjacent to the frontal plane 11. The first weight 7 is slidably positioned within the channel 4, wherein the jerking action of the fishing pole slidable movement of the first weight 7. As shown in FIG. 4 and FIG. 5, the channel 4 comprises an anterior end 5 and a ventral end 6. As shown in FIG. 4 and FIG. 5, the compression spring 8 comprises a first end 9 and a second end 10. More specifically, the anterior end 5 is positioned adjacent to the frontal plane 11. The ventral end 6 is positioned adjacent the transverse plane 12 and offset from an intersection of the frontal plane 11 and the transverse plane 12. The offset positioning of the ventral end 6 delineate the acute angle 14 about the channel 4 and the frontal plane 11. Preferably, the acute angle 14 ranges from 5 degrees to 25 degrees. The first end 9 is adjacently positioned to the ventral end 6 so that the compression spring 8 can be terminally positioned within the channel 4. Preferably, the first end 9 is connected to the ventral end 6 so that the compression spring 8 does not slide within the channel 4. The second end 10 is offset from the ventral end 6 and defines the free end of the compression spring 8. The length of the compression is spring is smaller than the length of the channel 4 thus allowing the first weight 7 to be slidably positioned in between the second end 10 and the anterior end 5.

Figure 6:
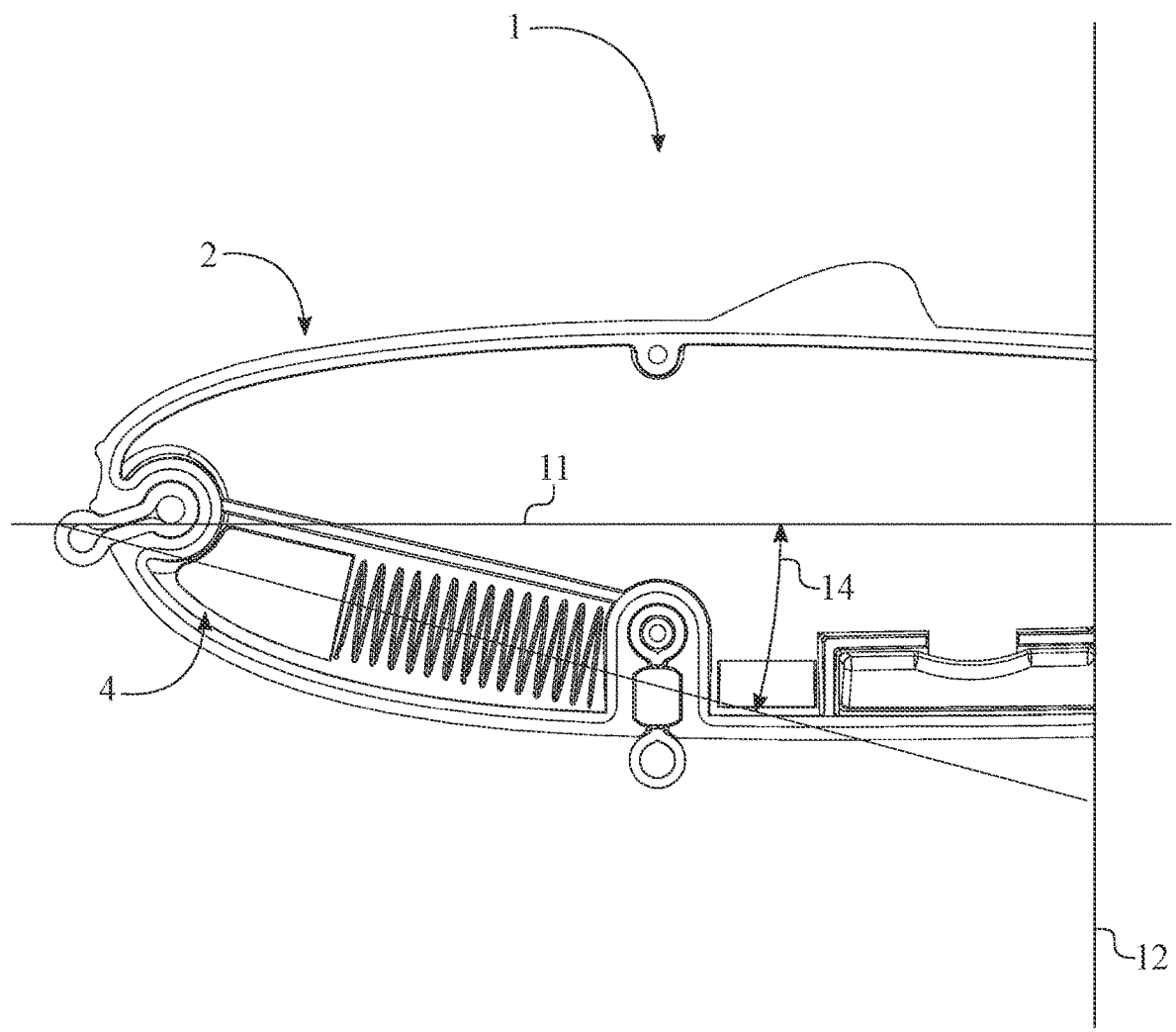
FIG. 6 is a cross-sectional view of the head section of the present invention, showing the angular positioning of the channel.
Figure 7:
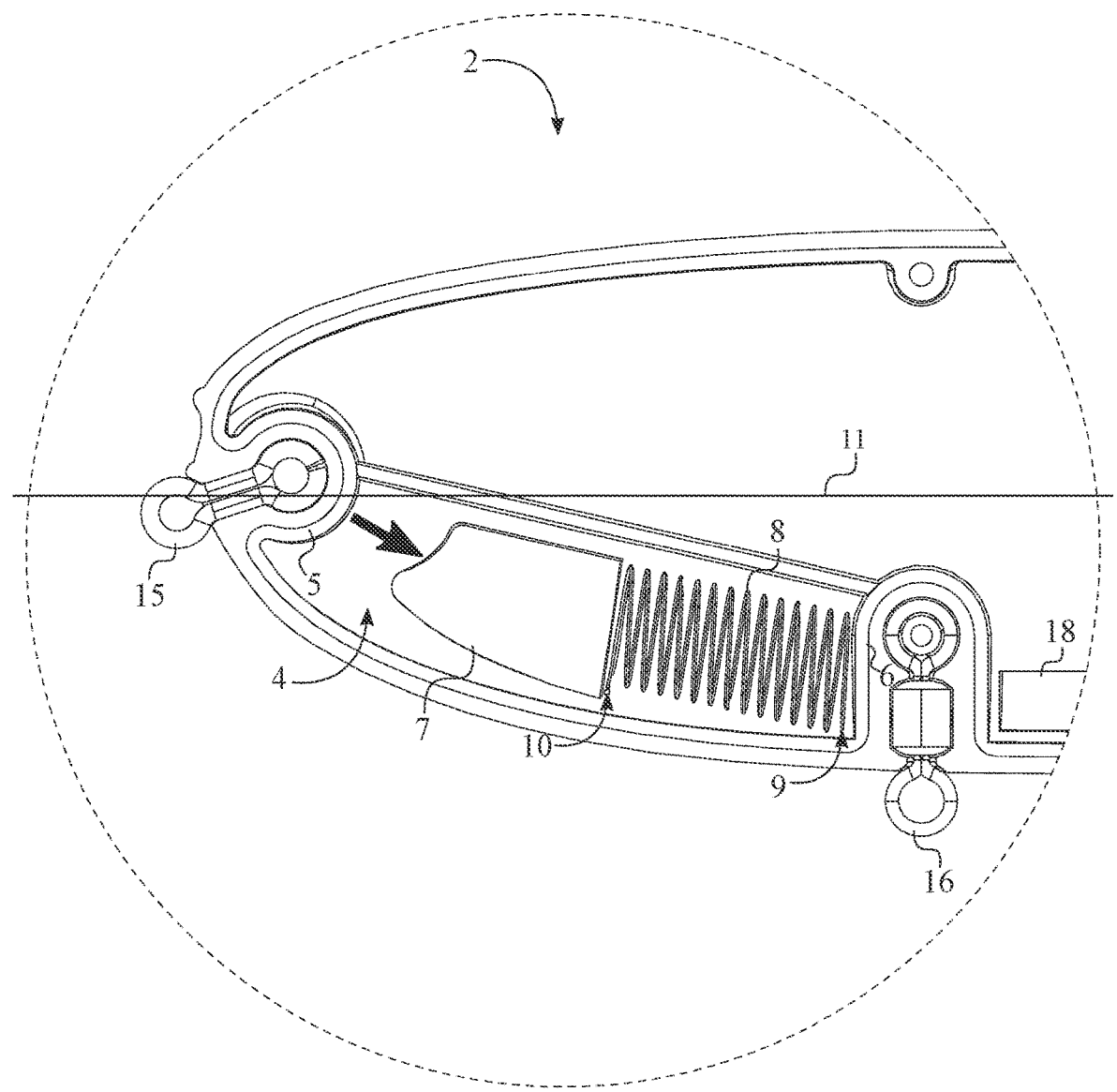
FIG. 7 is a cross-sectional view of the head section of the present invention, showing a detailed view of the internally mounted components and the slidably movement of the toward the ventral end.

As shown in FIGS. 4-6, when the fishing line is reeled and no jerking action is applied to the fishing rod, the first weight 7 does not slide within the channel 4 and maintain a stationary position adjacent to the anterior end 5. As a result, the present invention only glide through the body of water. As shown in FIG. 7, when the fishing line is reeled and jerking action is applied to the fishing rod, the first weight 7 slides toward the ventral end 6 and pushes the second end 10 toward the first end 9 thus converting the kinetic energy of the first weight 7 into the spring force. Once the first weight 7 stop sliding toward the ventral end 6, the spring force pushes the first weight 7 back into the initial positioning, which is adjacent to the anterior end 5. As a result, the present invention is able to leap out from the body of water due to the sliding movement of the first weight 7 toward the anterior end 5. In other words, the sliding movement of the first weight 7 toward the anterior end 5 provides sufficient force to completely leap out the present invention from the body of water.

In reference to FIG. 1 and FIG. 5, the present invention further comprises a line attachment 15. The line attachment 15 is connected to the head section 2 and positioned adjacent to the frontal plane 11 so that a fishing line can securely connected to the present invention. The line attachment 15 is positioned adjacent to the anterior end 5 of the channel 4 and the first weight 7. As a result, when jerking action is applied from the fishing rod, the applied force of the jerking action can easily be transferred into the first weight 7 thus minimizing amount of energy loss.

In reference to FIG. 1 and FIG. 4, the present invention further comprises a hook attachment 16. The hook attachment 16 is connected to the head section 2 and positioned adjacent to the transverse plane 12 so that a fishing hook can securely connected to the present invention. Furthermore, the hook attachment 16 is positioned adjacent to the transverse plane 12 and the ventral end 6 of the channel 4. As a result, the sliding movement of the first weight 7 can be accomplished without any interference from the hook attachment 16.

In reference to FIGS. 1-3, the present invention further comprises a plurality of fin-shaped features 17. The plurality of fin-shaped features 17 enhances the appearance of the floating lure 1, more accurately mirroring the features of a live bait. The plurality of fin-shaped features 17 also enhances the movement of the floating lure 1 through the body of water to better mimic the swimming movements of a live bait. The plurality of fin-shaped features 17 is distributed about the floating lure 1 and is externally connected to the floating lure 1.

In reference to FIG. 4, the present invention further comprises at least one second weight 18. More specifically, the at least one second weight 18 is mounted within the head section 2 so that the overall weight of the present invention can be adjusted and balanced with reference to the tail section 3.

In reference to FIG. 4, the present invention further comprises at least one third weight 19. More specifically, the at least one third weight 19 is mounted within the tail section 3 so that the overall weight of the present invention can be adjusted and balanced with reference to the head section 2.

Although the invention has been explained in relation to its preferred embodiment, it is to be understood that many other possible modifications and variations can be made without departing from the spirit and scope of the invention as hereinafter claimed.

What is claimed is:
1. A glide and leap system for fishing lure comprising:
a floating lure;
a channel;
a first weight;
a compression spring;
a hook attachment;
at least one second weight;
at least one third weight;
the floating lure comprising a head section and a tail section;
the head section and the tail section being oppositely positioned of each other about a transverse plane of the floating lure;
the head section and the tail section being two separate physical pieces of the floating lure;
the head section and the tail section being hingedly connected to each other;
the channel being integrated into the head section;
the channel being peripherally positioned within the head section;
the channel being positioned offset from the tail section;
the channel being concentrically positioned along a sagittal plane of the floating lure;
the channel being angularly oriented from a frontal plane of the floating lure to the transverse plane at an acute angle;
the acute angle being ranged from 5 degrees to 25 degrees;
the compression spring being positioned within the channel;
the compression spring being positioned adjacent to the transverse plane;
the first weight being adjacently positioned to the compression spring;
the first weight being slidably positioned within the channel; and
the first weight being positioned adjacent to the frontal plane;
the hook attachment being connected to the head section;
the hook attachment being positioned adjacent to the transverse plane;
the hook attachment being positioned adjacent to a ventral end of the channel;
the hook attachment being physically positioned against the ventral end;
the at least one second weight being mounted within the head section;
the at least one second weight being positioned adjacent to the hook attachment, opposite to the ventral end of the channel;
the at least one second weight being positioned offset from the tail section;
the at least one third weight being mounted within the tail section; and
the at least one third weight being positioned adjacent to the head section.

2. The glide and leap system for fishing lure as claimed in claim 1 comprising:
the channel comprising an anterior end and a ventral end;
the compression spring comprising a first end and a second end;
the anterior end being positioned adjacent to the frontal plane;
the ventral end being positioned adjacent the transverse plane;
the first end being adjacently positioned to the ventral end;
the second end being offset from the ventral end; and
the first weight being slidably positioned in between the second end and the anterior end.

3. The glide and leap system for fishing lure as claimed in claim 1 comprising:
a line attachment;
the line attachment being connected to the head section;
the line attachment being positioned adjacent to the frontal plane;
the line attachment being positioned adjacent to an anterior end of the channel;
the line attachment being physically positioned against the anterior end; and
the first weight being positioned adjacent to the line attachment.

4. The glide and leap system for fishing lure as claimed in claim 1 comprising:
a plurality of fin-shaped features;
the plurality of fin-shaped features being distributed about the floating lure; and
the plurality of fin-shaped features being externally connected to the floating lure.

5. A glide and leap system for fishing lure comprising:
a floating lure;
a channel;
a first weight;
a compression spring;
a line attachment;
a hook attachment;
at least one second weight;
the floating lure comprising a head section and a tail section;
the channel comprising an anterior end and a ventral end;
the compression spring comprising a first end and a second end;
the head section and the tail section being oppositely positioned of each other about a transverse plane of the floating lure;
the head section and the tail section being two separate physical pieces of the floating lure;
the head section and the tail section being hingedly connected to each other;
the channel being integrated into the head section;
the channel being peripherally positioned within the head section;
the channel being positioned offset from the tail section;
the channel being concentrically positioned along a sagittal plane of the floating lure;
the channel being angularly oriented from a frontal plane of the floating lure to the transverse plane at an acute angle;
the acute angle being ranged from 5 degrees to 25 degrees;
the compression spring being positioned within the channel;
the compression spring being positioned adjacent to the transverse plane;
the first weight being adjacently positioned to the compression spring;
the first weight being slidably positioned within the channel;
the first weight being positioned adjacent to the frontal plane;
the anterior end being positioned adjacent to the frontal plane;
the ventral end being positioned adjacent the transverse plane;
the first end being adjacently positioned to the ventral end;
the second end being offset from the ventral end;
the first weight being slidably positioned in between the second end and the anterior end;
the line attachment being connected to the head section;
the line attachment being positioned adjacent to the frontal plane;
the line attachment being positioned adjacent to the anterior end;
the line attachment being physically positioned against the anterior end;
the first weight being positioned adjacent to the line attachment;
the hook attachment being connected to the head section;
the hook attachment being positioned adjacent to the transverse plane;
the hook attachment being positioned adjacent to the ventral end of the channel; and
the hook attachment being physically positioned against the ventral end. the at least one second weight being mounted within the head section;
the at least one second weight being positioned adjacent to the hook attachment, opposite to the ventral end of the channel; and
the at least one second weight being positioned offset from the tail section.

6. The glide and leap system for fishing lure as claimed in claim 5 comprising:
a plurality of fin-shaped features;
the plurality of fin-shaped features being distributed about the floating lure; and
the plurality of fin-shaped features being externally connected to the floating lure.

7. The glide and leap system for fishing lure as claimed in claim 5 comprising:
at least one third weight; and
the at least one third weight being mounted within the tail section; and
the at least one third weight being positioned adjacent to the head section.

* * * * *